(12) United States Patent
Ollgaard

(10) Patent No.: US 10,125,822 B2
(45) Date of Patent: Nov. 13, 2018

(54) TOWER SECTION AND A METHOD FOR A TOWER SECTION

(71) Applicant: Vestas Wind Systems A/S, Aarhus N. (DK)

(72) Inventor: Borge Ollgaard, Esbjerg (DK)

(73) Assignee: Vestas Wind Systems A/S, Aarhus N. (DK)

(*) Notice: Subject to any disclaimer, the term of this patent is extended or adjusted under 35 U.S.C. 154(b) by 646 days.

(21) Appl. No.: 14/443,267

(22) PCT Filed: Nov. 13, 2013

(86) PCT No.: PCT/DK2013/050377
§ 371 (c)(1),
(2) Date: May 15, 2015

(87) PCT Pub. No.: WO2014/075687
PCT Pub. Date: May 22, 2014

(65) Prior Publication Data
US 2017/0321756 A1 Nov. 9, 2017

Related U.S. Application Data

(60) Provisional application No. 61/727,126, filed on Nov. 16, 2012.

(30) Foreign Application Priority Data

Nov. 15, 2012 (DK) ................................ 2012 70705

(51) Int. Cl.
*F16D 1/10* (2006.01)
*E04H 12/08* (2006.01)
(Continued)

(52) U.S. Cl.
CPC ............. *F16D 1/10* (2013.01); *E04H 12/085* (2013.01); *E04H 12/34* (2013.01); *E04H 12/342* (2013.01);
(Continued)

(58) Field of Classification Search
CPC ......... F16D 1/10; E04H 12/085; E04H 12/34; F03D 13/10; F03D 13/20
See application file for complete search history.

(56) References Cited

U.S. PATENT DOCUMENTS 6,568,712 B1    5/2003   Aaron, III
7,735,289 B2 *  6/2010   Ollgaard ............... E04H 12/085
                                                       52/633

(Continued)

FOREIGN PATENT DOCUMENTS

DE      102009051425 A1    5/2011
GB           2483678 A     3/2012
(Continued)

OTHER PUBLICATIONS

International Searching Authority, International Search Report issued in corresponding Application No. PCT/DK2013/050377, dated Apr. 2, 2014, 12 pages.
(Continued)

*Primary Examiner* — Jeanette E Chapman
(74) *Attorney, Agent, or Firm* — Wood Herron & Evans LLP

(57) ABSTRACT

Indicator device (90), for indicating proper alignment of bolt-and-nut holes of two abutting flanges (72,72') of two tower sections (2,5) of a wind turbine tower structure (1), the indicator device (90) comprising a connector (122) for connecting the indicator device (90) to an inner face (71) of one of the flanges, and a body (100) having a first body end (101) and an opposite second body end (112) closer to the (Continued)

Figure 1:
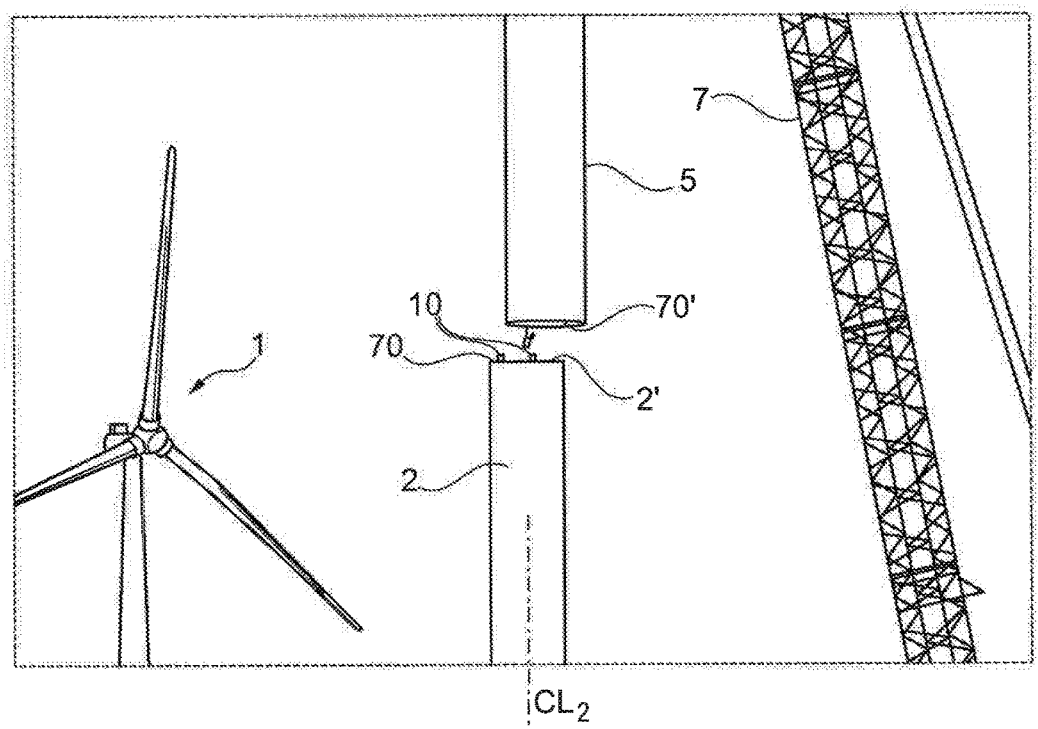

connector (122), the indicator device (90) including a resiliently deformable part (150), a pneumatic system or a hydraulic system allowing for the indicator device (90) to assume a normal configuration wherein the first body end (101) is distant from the connector (122), and a second configuration wherein the first body end (101) is located closer to the connector (122), the resiliently deformable part or pneumatic system or hydraulic system urging the first body end (101) from the second configuration towards the first configuration.

5 Claims, 4 Drawing Sheets

(51) Int. Cl.
      *E04H 12/34*       (2006.01)
      *F16L 1/10*       (2006.01)
      *F03D 13/20*       (2016.01)
      *F03D 13/10*       (2016.01)
      *F16B 19/02*       (2006.01)

(52) U.S. Cl.
    CPC ............. *F03D 13/10* (2016.05); *F03D 13/20* (2016.05); *F16L 1/10* (2013.01); *F05B 2230/604* (2013.01); *F16B 19/02* (2013.01); *Y02E 10/728* (2013.01); *Y02P 70/523* (2015.11)

(56) References Cited

U.S. PATENT DOCUMENTS

| | | | |
|---|---|---|---|
| 7,841,143 B2 * | 11/2010 | Jensen | E02D 27/42 52/296 |
| 7,928,593 B2 * | 4/2011 | Ollgaard | F03D 80/00 290/44 |
| 8,747,073 B2 * | 6/2014 | Ollgaard | B66D 1/36 416/244 A |
| 8,801,331 B2 * | 8/2014 | Perner | E02D 27/42 405/204 |
| 8,878,377 B2 * | 11/2014 | Ollgaard | F03D 11/04 290/44 |
| 9,518,563 B2 * | 12/2016 | Ollgaard | E04H 12/085 |
| 2010/0307097 A1 | 12/2010 | Word, III et al. | |
| 2012/0131876 A1 | 5/2012 | Nies | |
| 2013/0001954 A1 * | 1/2013 | Garc A Maestre | F03D 13/20 290/55 |

FOREIGN PATENT DOCUMENTS

WO         2011154110 A1    12/2011
WO    WO-2012075607 A1 *   6/2012   ......... E04H 12/344

OTHER PUBLICATIONS

Danish Patent and Trademark Office, Search Report issued in corresponding Application No. PA 2012 70705, dated Jun. 19, 2013, 4 pages.

* cited by examiner

TOWER SECTION AND A METHOD FOR A TOWER SECTION

BACKGROUND OF THE INVENTION

The present invention concerns a device for indicating correct bolt holt alignment, and possibly also for aligning bolt holes, during assembly of a tower section part of a wind turbine plant. Also claimed is a tower section configured to form part of a wind turbine and having such an indicator device, for indicating correct alignment and possibly also directional/rotational guiding of the structural part during assembly with another structural parts.

A bolt hole alignment device and a structural part of a wind turbine having such an alignment device is already known, wherein the alignment device is secured to a flange of one of the structural parts.

To increase personnel safety the alignment and assembly of two wind turbine tower sections should ideally be carried out without any personnel remaining inside the already standing hollow tower section anywhere near the upper end thereof. While this may be possible with the prior art solutions it remains a problem that the alignment devices should also be easy to install and preferably also easy to remove and reuse for the purpose of performing assembly with a next tower section. It is also a problem that the prior art devices for aligning bolt holes are easily damaged requiring extreme care on the side of a crane operator and, hence, adding to the construction time.

OBJECT OF THE INVENTION

The present invention sets out to solve the aforementioned problems by providing a novel bolt hole alignment indicator device which may—in a preferred embodiment—also assist in the actual alignment, as well as a method for assembling sections of a tower of a wind turbine plant using the novel indicator device, wherein the indicator device may be mounted to the inside face of a flange of one of the tower section from the inside of the latter, using—as desired—a dedicated connector in the form of a magnet. The indicator device may be an integral part of a primary alignment device used for aligning the central axis of the two tower section and wherein a leverage action arising from external loads on the primary alignment device during the assembly procedure provides temporary forces required to maintain the alignment device in correct position.

SUMMARY OF THE INVENTION

More specifically the invention proposes use of a specialized indicator device, for indicating proper alignment of bolt-and-nut holes of two abutting flanges of two tower sections of a wind turbine tower structure, the indicator device comprising a connector for connecting the indicator device to an inner face of one of the flanges, and a body having a first body end and an opposite second body end closer to the connector, the indicator device including a resiliently deformable part, a pneumatic system or a hydraulic system allowing for the indicator device to assume a normal configuration wherein the first body end is distant from the connector, and a second configuration wherein the first body end is located closer to the connector, the resiliently deformable part or pneumatic system or hydraulic system urging the first body end from the second configuration towards the first configuration.

It is foreseen that three or more indicator devices may be used, being preferably equidistantly spaced along the periphery or rim of the flange.

DETAILED DESCRIPTION OF PREFERRED EMBODIMENTS

Figure 2:
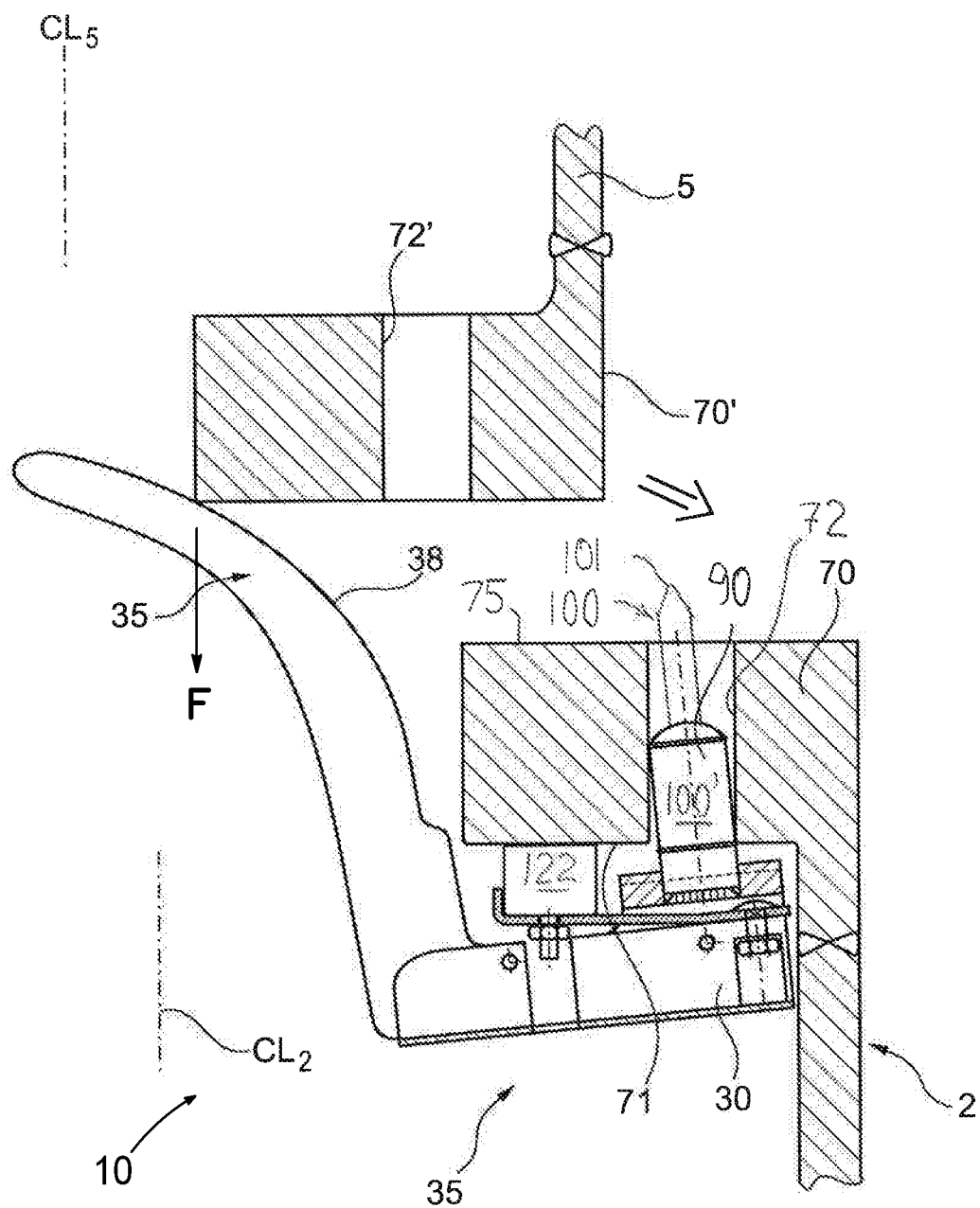
Figure 3:
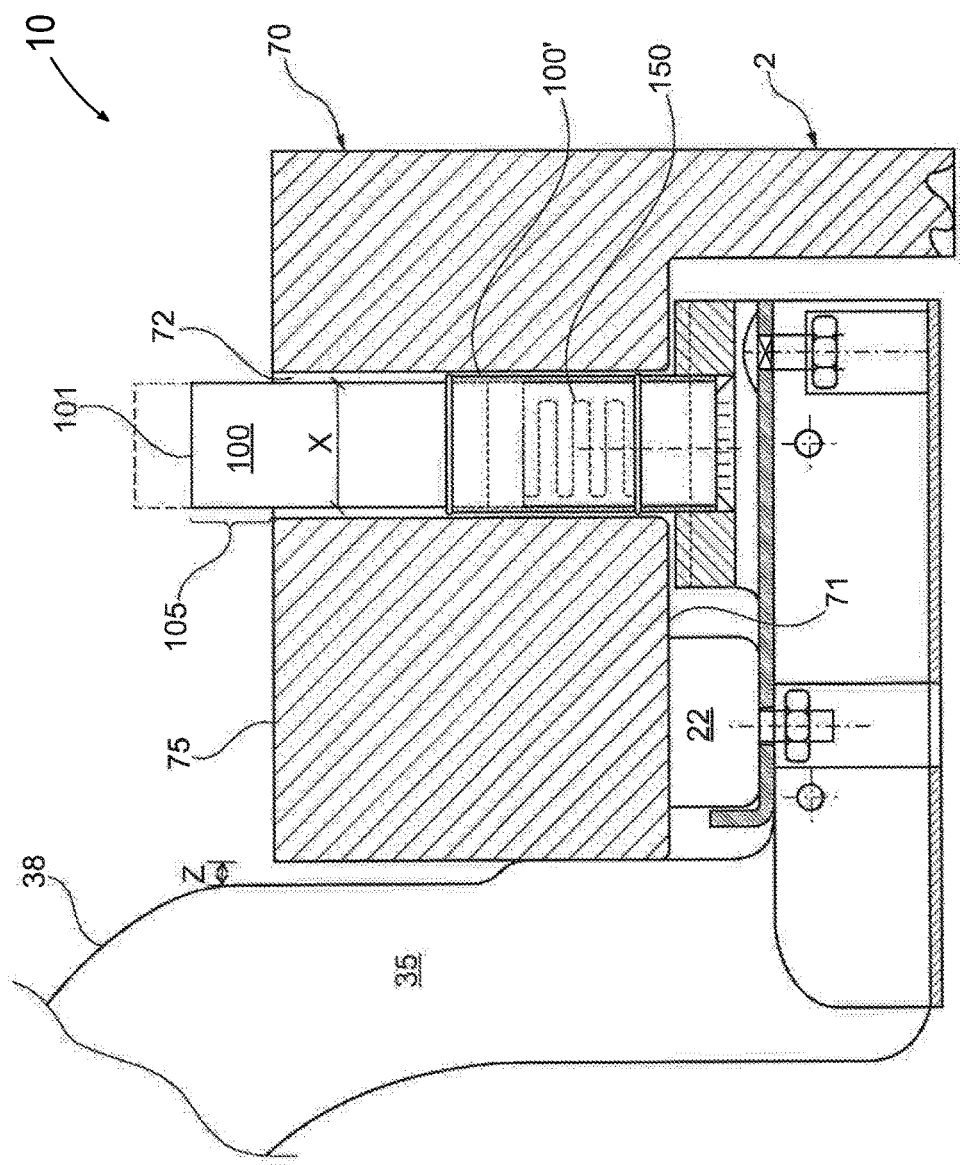
Figure 4:
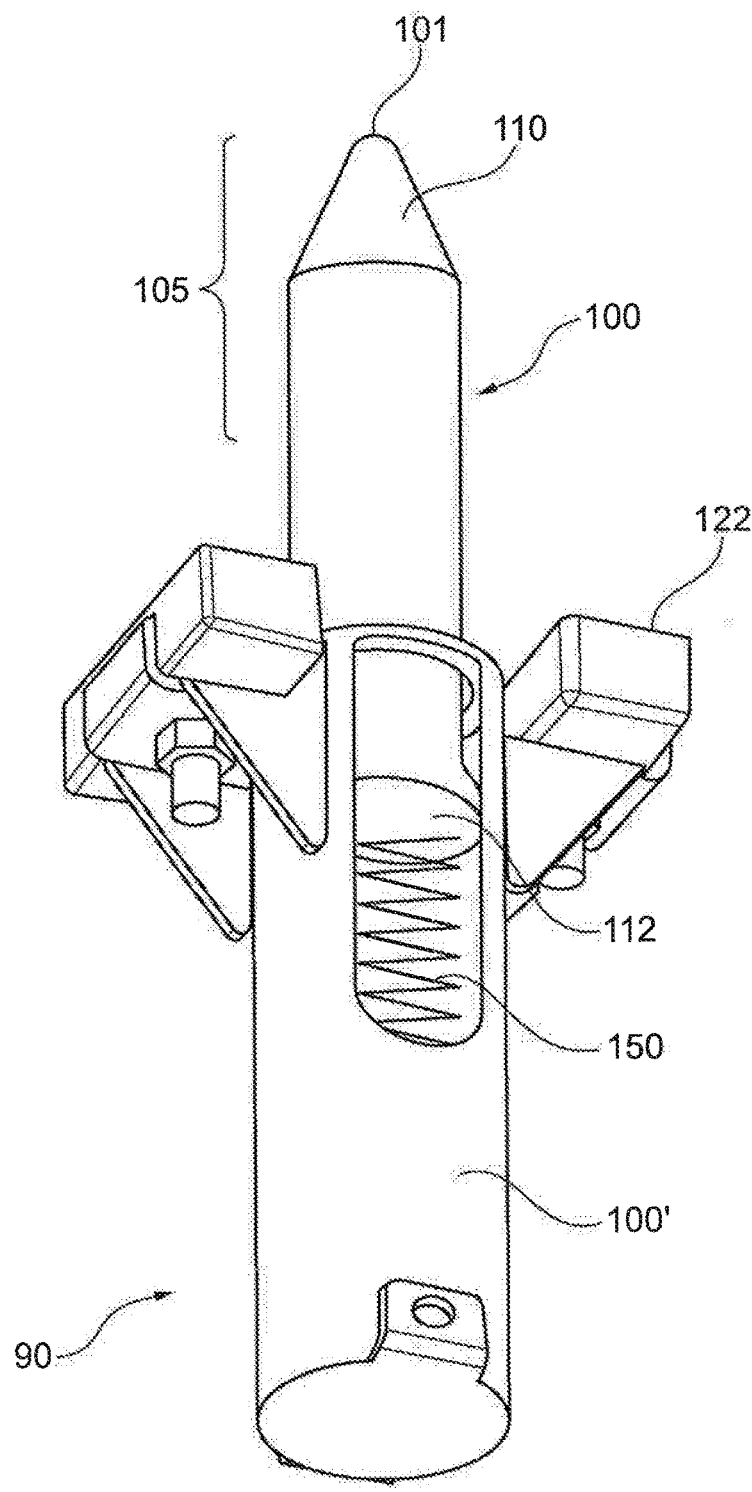

Embodiments of the present invention will now be explained in details with reference to the appended schematic drawings where FIG. 1 is a drawing showing two tower sections of a wind turbine being assembled, FIGS. 2 and 3 are schematic partial cross-sectional side views showing a first and second embodiment of the inventive indicator device, respectively, integral with a primary alignment device and mounted to a tower flange, and FIG. 4 shows a third embodiment of the indicator device, operative also for alignment and in a first configuration.

FIG. 1 shows a lower or first hollow metal tower section 2 standing on a base and configured to form part of the supporting tower structure of a wind power plant 1. A second hollow tower section 5 is suspended from a crane 7 and is to be connected with the first tower section 2. For safety reasons the assembly of two tower sections 2, 5 should ideally be carried out without any personnel remaining inside the hollow tower section 2 anywhere near the upper end 2'.

For assisting in aligning the two tower sections a plurality of primary alignment devices schematically illustrated by numeral 10 may be mounted to an inwardly oriented peripheral flange 70 at the upper or first end 2' of the first tower section 2. The primary alignment devices 10 preferably have a guide portion with a protracted guiding surface part which extends upwardly, i.e. in the general direction away from the opposite second end (not shown) of the first tower section 2, generally inwardly towards a centre line $CL_2$ of the first tower section 2, and preferably also along a portion of the rim of the tower section 2. In this way, on lowering the second tower section 5 towards the first tower section 2 the inside face of a corresponding peripheral flange 70' of the second tower section 5 will bear against the guiding surface part, and the second tower section 5 will shift laterally towards the desired position in alignment with the centre line $CL_2$ of the first tower section 2. This procedure is shown schematically in FIG. 2.

When the centre lines $CL_2$ and $CL_5$ are aligned, or essentially aligned, the upper tower section 5 is then lowered such that the peripheral flange 70' thereof sits on the aforementioned peripheral flange 70 of the first tower section 2, with a multiplicity of bolt holes on the two adjoining flanges 70, 70' being aligned. The two tower sections 2, 5 are then connected using bolts extending through the aligned bolt holes 72, 72' of the two adjoining flanges 70, 70'.

To properly align the bolt holes 72, 72' during the lowering procedure a secondary alignment by a slight rotation of the upper tower section 5 about its longitudinal centre line $CL_5$ must normally be done by the operator of the crane 7 right before the two flanges 70, 70' touch each other. According to the invention an indicator device 90 is proposed whereby correct alignment of the bolt holes 72, 72' is indicated to the operator in that the upper tower section 5 at this instance becomes locked against any further rotation. This secondary alignment may if preferred be assisted by a suitable design of the indicator device 90, as discussed further below, wherein the indicator device may serve the additional function as a secondary alignment device.

Shown in FIGS. 2 and 3 is a first and second embodiment of the invention, respectively, wherein the aforementioned indicator device 90 is designed as an integral part of the aforementioned primary alignment device 10 and where the indicator device 90 and the primary alignment device 10 are installed from below the flange 70 using a common connector indicated by numeral 122 and which may be a magnet. In use, a force F arising from the upper tower section 5 striking the guiding surface part 38 during the primary alignment procedure will result in some deformation by inward bending or deflection of the guiding surface part 38, the forces being transferred to the flange 70 by a body 30 of the primary alignment device 10 being connected to the flange 70 as discussed further below.

Shown in FIG. 2 is a rigid elongated tubular sheath 100' that extends from below the flange 70 into one of the through-going holes 72 used for the final bolt-and-nut connection of the two structural parts 2, 5. The length of the sheath 100' is selected such that the upper free end thereof does not extend above the upper face 75 of the flange 70, and the hole 72 is preferably slightly oversized compared to the outer dimension of the sheath 100'. The sheath 100' is normally not, at the outset, in direct engagement with the flange 70. Such engagement with the flange 70 arises primarily when the guiding surface part 38 is subjected to the relatively large external force F which tend to deform, elastically or not, the guiding surface part 38 whereby the sheath 100' rigidly connected to the body 30 tilts within the hole 72, to secure the primary alignment device 10 to the flange 70 by opposite faces of the sheath 100' pressing against the inside of hole 72, thus effectively providing somewhat of a wedge-effect, preventing undesired release of the sheath 100' from the hole 72. Preferably, in the embodiments of FIGS. 2 and 3 a root portion of the guiding surface part 38 is located at a distance z from the outer face of the flange 70. This spacing accommodates for situations where the upper flange 70' may be slightly oval, requiring a slight off-set of the upper tower section 5 to allow for alignment of the bolt holes 72, 72'.

The indicator device 90, also shown in a third embodiment in FIG. 4, generally includes a body 100, best seen in FIGS. 3 and 4, which is extends in the hole 72 and which has a first body end 101 and an opposite second body end 112, a portion 105 of the body 100 including the first body end 101 projecting from the outer face 75 of the flange 70 in a first configuration of the indicator device 90. The indicator device 90 includes means 150, such as the illustrated spring 150 or a pneumatic system or a hydraulic system, that allows for the indicator device 90 to assume a second configuration wherein the first body end 101 is located closer to the outer face 75. The means 150 are configured to urge the indicator device 90 to assume the first configuration shown in broken lines in FIG. 3.

FIG. 4 shows the indicator device 90 in one basic design in which it is separate from the aforementioned primary alignment device 10, with magnets 122 for mounting the device 90 against the lower face 71 of the metal flange 70, with a cylindrical sheath or barrel 100' including a spring 150 and receiving a portion of a displaceable bar 100 configured to extend into a bolt hole 72, with a projecting portion 105. The bar 100 is shown in a position corresponding to a first configuration of the device wherein stops prevent the bar 100 from moving further out from the sheath 100'. Preferably, the length of the sheath 100' is such that the bar 100 may be moved to a retracted position where a first or upper end 101 of the bar 100 is flush with the upper face 75 of the flange, i.e. where the entire portion 105 is retracted.

Although in FIG. 3 the upper end 101 is flat it is preferred that the bar 100 has a part 110 tapering towards the upper end 101, as shown in FIG. 4. In this way the face of the tapering part 110 may serve as a secondary alignment device which will ride against the entry portion of an adjoining hole 72' of the second tower section 5, thus providing a force that tends to align hole 72' with the hole 72 of flange 70, by rotating the second tower section 5 as it is lowered.

The body 100 may alternatively itself be of an elastic material defining as such the means 150, and the sheath 100' may be press-fit in the hole 72. A lock (not shown) may be provided for maintaining the indicator device in the first configuration, after having assumed once the second configuration.

It will be understood that in order to connect the two tower sections 2, 5 the crane operator proceeds by first lowering the upper tower section 5 towards the lower one 2, until contacting the annular flange 70' of the upper tower section 5 with the first body end 101, to bring the indicator device 90 towards the second configuration, at which point the crane operator rotates the upper tower section 5 until the indicator device 90 indicates, such as visually or by an electronic signal being sent to the crane operator, the first configuration, wherein the hole 72 having the indicator device 90 is aligned with a hole 72' of the upper tower section 5 such that it is capable of reassuming the first configuration in that the tip or first end 101 of the bar or body 100 is driven into the aligned hole 72' by the means 150. Preferably, the indicator device 90 is mounted to the lower tower section 2, but it may be mounted to the upper tower section 5. Rotation may be induced by configuring the body 100 with a tapering part 110 with a conical (see FIG. 4) or spherical shape defining guiding faces.

Where the lower tower section 2 has the primary alignment device discussed above and shown in FIGS. 1-3, before said rotation, the upper tower section 5 is first brought into contact with the protracted guiding surface part 38, to shift the upper tower section 5 laterally. After the rotation the indicator device 90 is removed, and a connecting bolt is then passed through all the adjoining holes 72, 72' for connecting the two tower sections 2, 5.

Although the present invention has been described in connection with the specified embodiments, it should not be construed as being in any way limited to the presented examples. In particular, while the term "bar" as used herein may preferably refer to a member having a circular cross-section, members having other cross-sectional configurations may be used; this also applies to the cross-section of the holes, that preferably, however, have a circular or oval/elliptical cross-section. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of assembling two tower sections with respective annular flanges with through-holes for bolt-and-nut connection of the two tower sections, comprising the steps of:

providing an indicator device mounted in one of the through-holes in the annular flange of one of the tower sections, the indicator device movable between first and second configurations and for indicating alignment of the through-hole in which the indicator device is positioned with a through-hole in the annular flange of the other tower section, lowering one tower section towards the other tower section, contacting the annular flange of the other tower section with the indicator device, to bring the indicator device towards the second configuration, and rotating one of the tower sections until the indicator device indicates the first configuration, wherein the through-holes of the one tower section are aligned with the through-holes of the other tower section.

2. The method of claim 1, wherein before said rotation, one of the tower sections is brought into contact with a protracted guiding surface part to shift the one tower section laterally.

3. The method of claim 1, wherein after the rotation, the indicator device is removed, and wherein a connecting bolt is then passed through the through-hole in which the indicator device was mounted for connecting the two tower sections.

4. The method of claim 1, further comprising locking the indicator device in the first configuration after the alignment of the through-holes.

5. A method of assembling two tower sections with respective annular flanges with through-holes for bolt-and-nut connection of the two tower sections, comprising:

providing an indicator device mounted in one of the through-holes in the annular flange of one of the tower sections, the indicator device comprising a first body portion and a second body portion movable relative to the first body portion between an extended position and a retracted position, wherein the second body portion includes a first end positioned within the first body portion and a second end that extends out of the first body portion, and wherein when the indicator device is mounted to the annular flange, the second end of the second body portion extends away from the annular flange of the one tower section when the second body portion is in the extended position, lowering one tower section towards the other tower section, contacting the annular flange of the other tower section with the second end of the second body portion of the indicator device, wherein the contact moves the second body portion toward the retracted position, wherein the second body portion is prevented from moving toward the extended position when the through-holes of the two tower sections are misaligned, and wherein the second body portion is permitted to move toward the extended position when the through-holes of the two tower sections are aligned, and rotating the tower sections relative to each other to allow the second body portion to move toward the extended position, wherein the through-holes of the one tower section are aligned with the through-holes of the other tower section when the second body portion moves to the extended position.

\* \* \* \* \*